US012791174B1

(12) United States Patent
Lin

(10) Patent No.: US 12,791,174 B1
(45) Date of Patent: Nov. 10, 2026

(54) LIGHT-EMITTING BASE FOR ILLUMINATING DECORATIVE ARTICLE

(71) Applicant: Fangfang Lin, Taizhou City (CN)

(72) Inventor: Fangfang Lin, Taizhou City (CN)

( * ) Notice: Subject to any disclaimer, the term of this patent is extended or adjusted under 35 U.S.C. 154(b) by 0 days.

(21) Appl. No.: 19/320,240

(22) Filed: Sep. 5, 2025

(30) Foreign Application Priority Data

Aug. 21, 2025 (CN) ......................... 202521793130.5

(51) Int. Cl.
*F21V 21/06* (2006.01)
*F21V 17/12* (2006.01)

(52) U.S. Cl.
CPC .............. *F21V 21/06* (2013.01); *F21V 17/12* (2013.01)

(58) Field of Classification Search
CPC .. F21V 21/06; F21V 2200/00; F21V 2200/10; F21V 2200/13; F21V 2200/15; F21V 2200/17; F21V 2200/20; F21V 2200/30; F21V 2200/40; F21V 17/12; F21K 9/61
See application file for complete search history.

(56) References Cited

U.S. PATENT DOCUMENTS 7,261,456 B2 * 8/2007 Liu ........................... F21L 4/00 362/555
2001/0024973 A1 * 9/2001 Meredith ............. A63H 33/009 463/36

FOREIGN PATENT DOCUMENTS

WO WO-2014079159 A1 * 5/2014 ............... F21K 9/61

* cited by examiner

*Primary Examiner* — Robert J May

(57) ABSTRACT

Disclosed in the present application is a light-emitting base for illuminating a decorative article, including a housing formed by connecting an upper cover and a lower cover; a light source illuminating the decorative article, disposed inside the housing; and a hollow supporting structure integrally formed at a center of the upper cover and extending toward the lower cover, wherein a slot is formed in the supporting structure for connecting and supporting the decorative article, light emitted from the light source passes through an inner cavity of the slot and illuminates the decorative article, and an inner wall of the slot is provided with a threaded structure, such that the light-emitting base is detachably connected to the decorative article via the threaded structure.

8 Claims, 4 Drawing Sheets

LIGHT-EMITTING BASE FOR ILLUMINATING DECORATIVE ARTICLE

CROSS-REFERENCE TO RELATED APPLICATIONS

The application claims priority of Chinese patent application CN2025217931305, filed on Aug. 21, 2025, which is incorporated herein by reference in its entireties.

TECHNICAL FIELD

The present application relates to the technical field of decorative devices, in particular to a light-emitting base for illuminating a decorative article.

BACKGROUND

To enhance the festive atmosphere or serve as daily decorations, people often use small artificial trees to embellish tabletops or indoor spaces. In the prior art, in order to improve the ornamental effect, artificial trees are usually equipped with lighting functions.

One common lighting method is to wrap an external light string around a tree body. This method is not only cumbersome to install, but also the messy wires seriously undermine the overall aesthetic appeal, particularly for desktop artificial trees prioritizing delicate compactness, where such clutter appears especially redundant.

Another method is to provide a base or a bracket capable of emitting light. However, existing light-emitting bases for artificial trees, such as bases for large Christmas trees, generally suffer from the following problems: First, they are bulky and structurally complex, originally designed to support large tree bodies several meters high, and therefore completely unsuitable for compact tabletop environments; Second, they commonly adopt an alternating-current power supply and must be connected to external power cords, which greatly restricts the degree of freedom of placement of the product and deprives the product of the flexibility required for a portable tabletop ornament; Third, lighting modes thereof are generally simple, such as emitting light only from the side of the base or by external illumination, which lacks close integration with the tree body, resulting in stiff light-and-shadow effects and a lack of an integrated aesthetic design sense.

Therefore, the current market lacks a light-emitting base specially designed for small desktop artificial trees, which is compact in structure, portable, movable, free of external wires, and whose lighting mode can perfectly integrate with the tree body to provide a unique aesthetic effect.

SUMMARY

Based on this, it is necessary to provide a light-emitting base for illuminating a decorative article to solve at least one of the above technical problems.

The present application provides a light-emitting base for illuminating a decorative article, comprising:

- a housing formed by connecting an upper cover and a lower cover;
- a light source illuminating the decorative article, disposed inside the housing; and
- a hollow supporting structure integrally formed at a center of the upper cover and extending toward the lower cover, where a slot is formed in the supporting structure for connecting and supporting the decorative article, light emitted from the light source passes through an inner cavity of the slot and illuminates the decorative article, and an inner wall of the slot is provided with a threaded structure, such that the light-emitting base is detachably connected to the decorative article via the threaded structure.

Further, the supporting structure is cylindrical or frustum-shaped.

Further, the light source is disposed directly facing the inner cavity of the slot, and the light emitted therefrom passes through the inner cavity to illuminate the decorative article from an inner side of the decorative article.

Further, the light source is disposed on a bottom side of the supporting structure.

Further, the light source comprises a plurality of sub-light sources, and the plurality of sub-light sources are discretely distributed on the bottom side of the supporting structure.

Further, the light-emitting base further comprises a rechargeable power source, which is disposed inside the housing and supplies power to the light source.

Further, at least one button is provided on a surface of the upper cover for controlling an on-off state and a lighting mode of the light source.

Further, at least one light-transmitting area is provided on a side wall of the upper cover and/or the lower cover, and the light emitted from the light source is capable of at least partially passing through the light-transmitting area to be emitted outward to form ambient atmosphere light.

Further, at least one light-transmitting area is provided on a top wall of the upper cover, and the light emitted from the light source is capable of at least partially passing through the light-transmitting area to be emitted outward to illuminate the decorative article from an outer side of the decorative article.

Further, the upper cover is connected with the lower cover via a detachable connecting structure.

The light-emitting base for illuminating a decorative article described above has the following beneficial effects:

- Integrated light emission and connection function: By providing a light-transmitting or semi-transparent hollow supporting structure at the center of the upper cover, the connection function between the decorative tree and the base is cleverly integrated with the illumination function, simplifying the structure and avoiding the complexity and unsightliness of traditionally wrapping an external light string.
- Inward lighting effect: The light source is disposed adjacent to the supporting structure, and light passes through the supporting structure to illuminate the decorative tree, achieving a unique inside-out lighting effect. The light is soft and uniform, enhancing both decoration and ornamental effects, and is distinguishable from the harsh light and shadow of traditional external illumination.
- Compact and easy to use: A light-emitting component is integrated into the interior of the base, forming an independent and easy-to-use unit, particularly suitable for small desktop decorative trees, allowing convenient placement and mobility.

DESCRIPTION OF THE DRAWINGS

The drawings are only used for exemplary description and shall not be construed as limiting the present patent; the same reference signs are used for components with the same structure and function. In the drawings.

DESCRIPTIONS OF THE REFERENCE SIGNS

100—light-emitting base;

10—upper cover; 11—supporting structure; 12—slot; 13—button through hole; 14—charging port hole; 15—button; 16—positioning post;

20—lower cover; 21—reinforcing rib; 22—mounting post; 23—battery compartment; 24—positioning sleeve;

30—bracket; 31—battery; 32—circuit board mounting portion; 33—circuit board; 34—light source; 36—fastening screw hole; 37—charging port; 38—countersunk hole.

DETAILED DESCRIPTION OF EMBODIMENTS

The technical solutions in the embodiments of the present application will be described below in combination with the drawings in the embodiments of the present application. In the description of the embodiments of the present application, unless otherwise stated, "/" means or, for example, A/B may represent A or B; "and/or" herein is merely a description of the association relationship of associated objects, representing that three types of relationships may exist, such as A and/or B, which can represent the three situations: the presence of A alone, the presence of A and B simultaneously, and the presence of B alone. In addition, in the description of the embodiments of the present application, "a plurality of" refers to two or more than two.

Hereinafter, the terms "first" and "second" are used merely for descriptive purposes, and cannot be understood as indicating or implying relative importance or implicitly specifying the number of indicated technical features. Thus, the features defined with "first" and "second" may explicitly or implicitly include one or more of the features.

In the description of the embodiments of the present application, unless otherwise stated, "a plurality of" means two or more than two.

Figure 1:
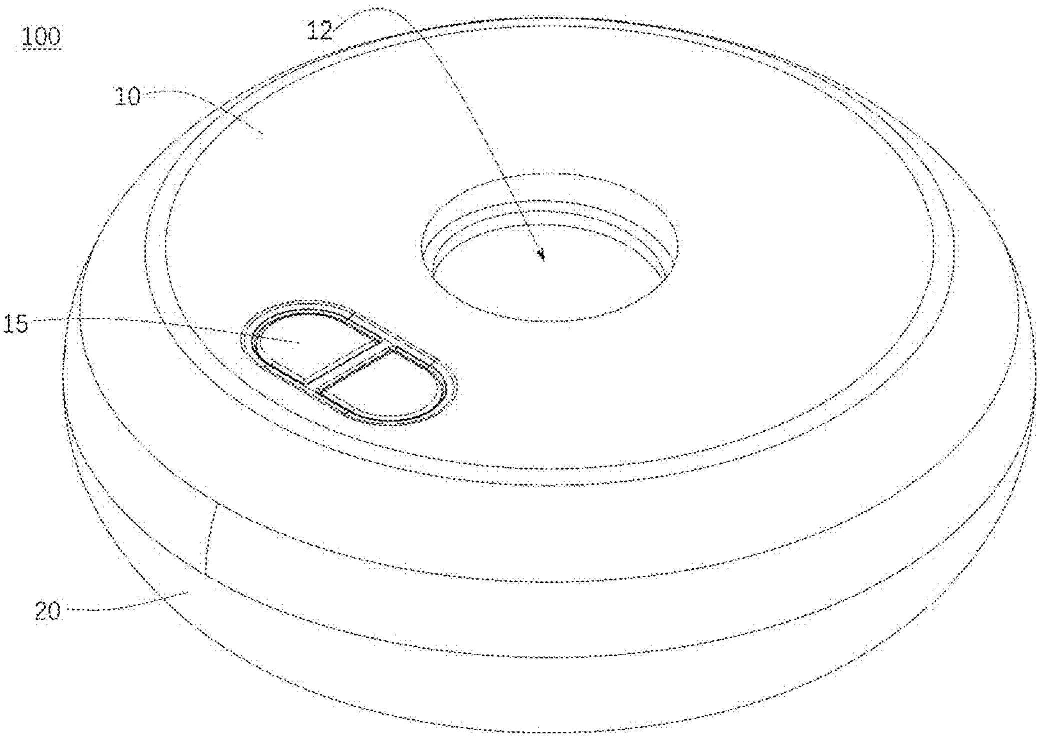
FIG. 1 is a schematic structural diagram of a light-emitting base according to an embodiment of the present application.
Figure 2:
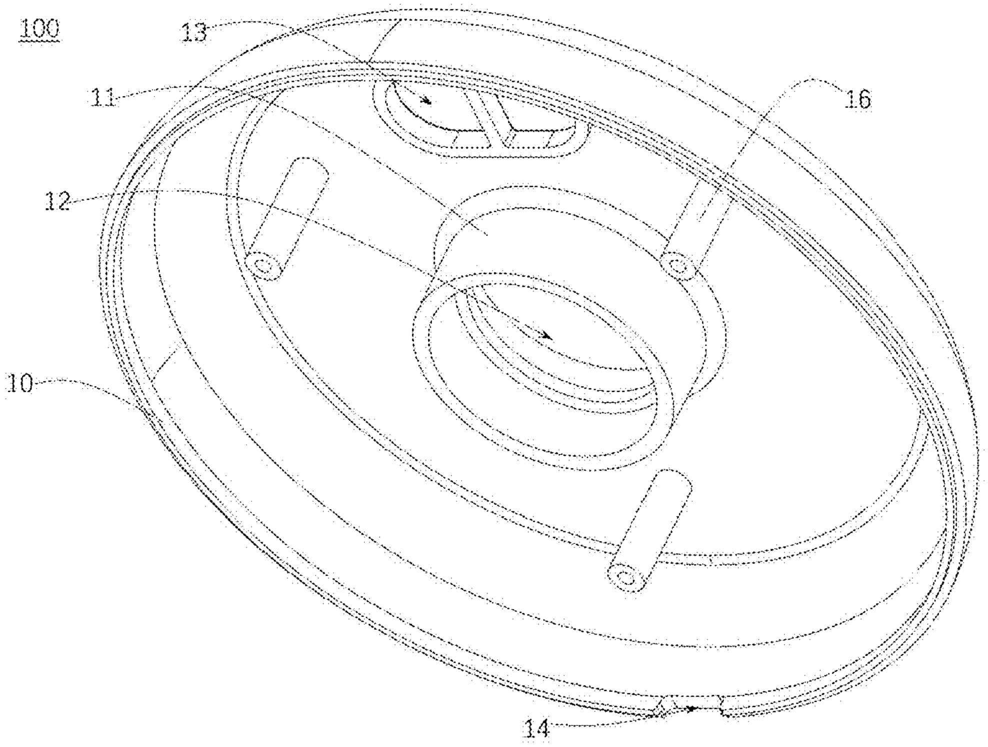
FIG. 2 is a stereoscopic structural schematic diagram of an upper cover according to an embodiment of the present application.
Figure 3:
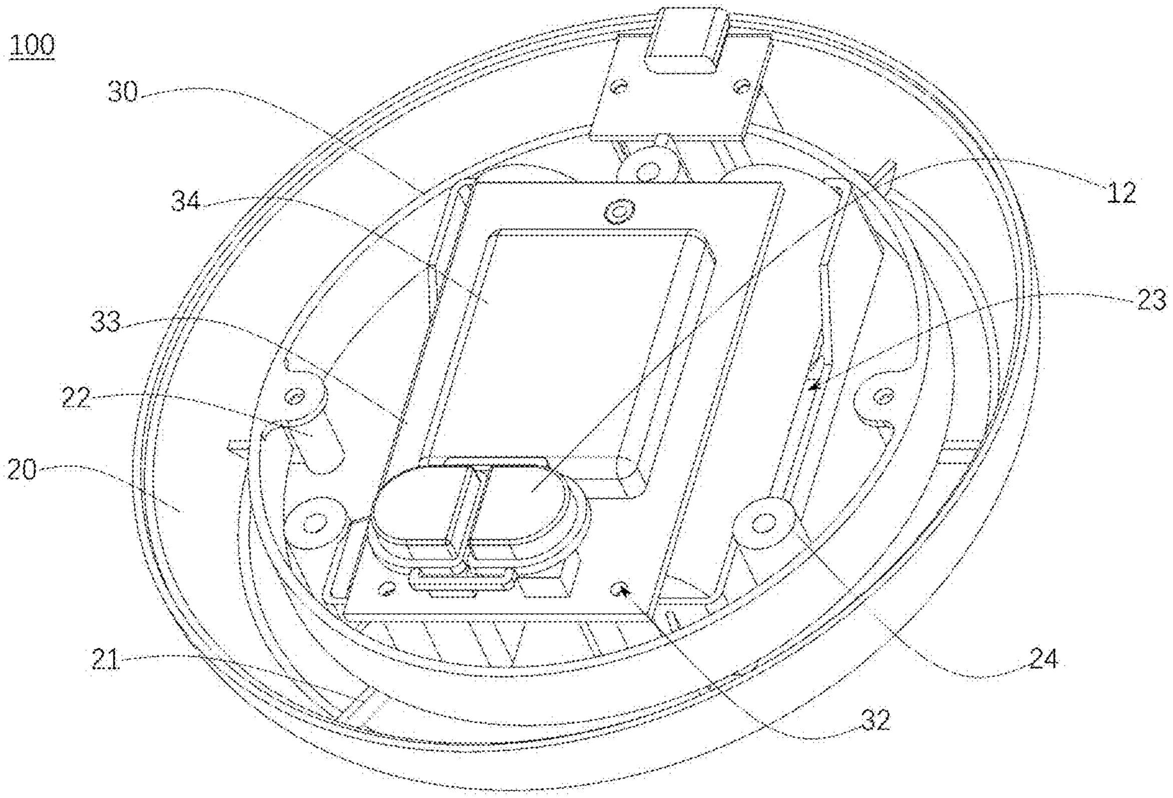
FIG. 3 is a stereoscopic structural schematic diagram of a lower cover according to an embodiment of the present application.

With reference to FIG. 1 and FIG. 2, the present application provides a light-emitting base 100 for illuminating a decorative article. The decorative article may be, for example, a decorative tree, a tree-top star, an angel, etc., but is not limited thereto. In this embodiment, a decorative tree is taken as an example. In terms of the overall structure, the light-emitting base 100 adopts a highly integrated design, mainly including a housing and a functional module accommodated inside the housing. The housing defines the compact and rounded appearance of the product and protects internal components. The functional module realizes all electrical and optical functions of the product.

Specifically, the light-emitting base includes an upper cover 10 and a lower cover 20, which are detachably connected by screws (not shown in the figure) to jointly form a closed and hollow housing. Inside the housing, a bracket 30 is disposed. Core electronic components of the product are centrally mounted on the bracket 30, including a rechargeable power source module (including two cylindrical rechargeable batteries 31 and a circuit board 33) and a light source 34. At a central position of the upper cover 10, a hollow supporting structure 11 extends inward in an integrally formed manner, and the structure simultaneously undertakes the dual functions of mechanical supporting and optical guidance.

A. Housing Structure

The housing serves as an external frame of the light-emitting base and includes an upper cover 10 and a lower cover 20, which together form a clamshell-like closed structure. This design gives the product a seamless and integrated appearance with smooth lines, thus boasting a high aesthetic value. The housing may be made of engineering plastics such as ABS or PC, manufactured through injection molding, thereby not only ensuring sufficient structural strength but also effectively controlling costs and weight.

The upper cover 10 is a main interface for direct user interaction and function presentation. A hollow supporting structure 11 protruding inward is provided at a central position thereof. In addition, buttons 15 (two D-shaped buttons as shown in FIG. 1) corresponding to internal circuit switches are provided on a surface of the upper cover 10. A user can control on/off switching and mode switching of the light emitted from the base by pressing the buttons 15. Buckling edges of the upper cover 10 and the lower cover 20 are precisely designed, ensuring tightness after assembly and forming a stable and compact whole.

The lower cover 20 serves as a pedestal for the entire light-emitting base. A plurality of reinforcing ribs 21 are designed inside the lower cover to enhance overall rigidity and prevent deformation. Meanwhile, a plurality of mounting posts 22 are disposed inside the lower cover 20, which provide precise positioning references and firm fixing points for the bracket 30, ensuring that an internal module remains stable even when subjected to vibration or impact. In addition, a dedicated battery compartment 23 is disposed on the lower cover 20 for tightly accommodating the rechargeable batteries 31.

B. Bracket

The bracket 30 is an independent functional carrying platform that neatly integrates the originally scattered electronic components into a unified structure. As shown in FIG. 2, the bracket 30 features a meticulously designed structure. A circuit board mounting portion 32 is provided on the bracket, and the circuit board 33 is fixed thereon via screws or snap-fit joints. The light source 34 (usually one or more high-brightness LEDs) is also fixed at a specific position on the bracket. In addition, a transmission structure of a micro-switch (located on the circuit board 33) corresponding to the buttons 15 of the upper cover 10 is also integrated onto the bracket 30. By pre-installing all core functional components onto the bracket 30, the final production and assembly process is greatly simplified: workers only need to place this fully functional bracket module into the lower cover 20 and then cover the upper cover 10 to complete the assembly of the entire product, significantly improving production efficiency and product consistency.

C. Power Supply and Control System

The light-emitting base 100 of the present application does not require a continuous external power supply, which relies on an internal power source and control system. The system mainly includes rechargeable batteries 31 and a circuit board 33.

The rechargeable batteries 31 provide power for the entire device. Rechargeable lithium batteries (such as 18650) are used as an energy source. Compared with disposable batteries, the rechargeable lithium batteries are more environmentally friendly and economical; compared with an alternating-current power supply, the rechargeable lithium batteries offer unparalleled portability.

Figure 4:
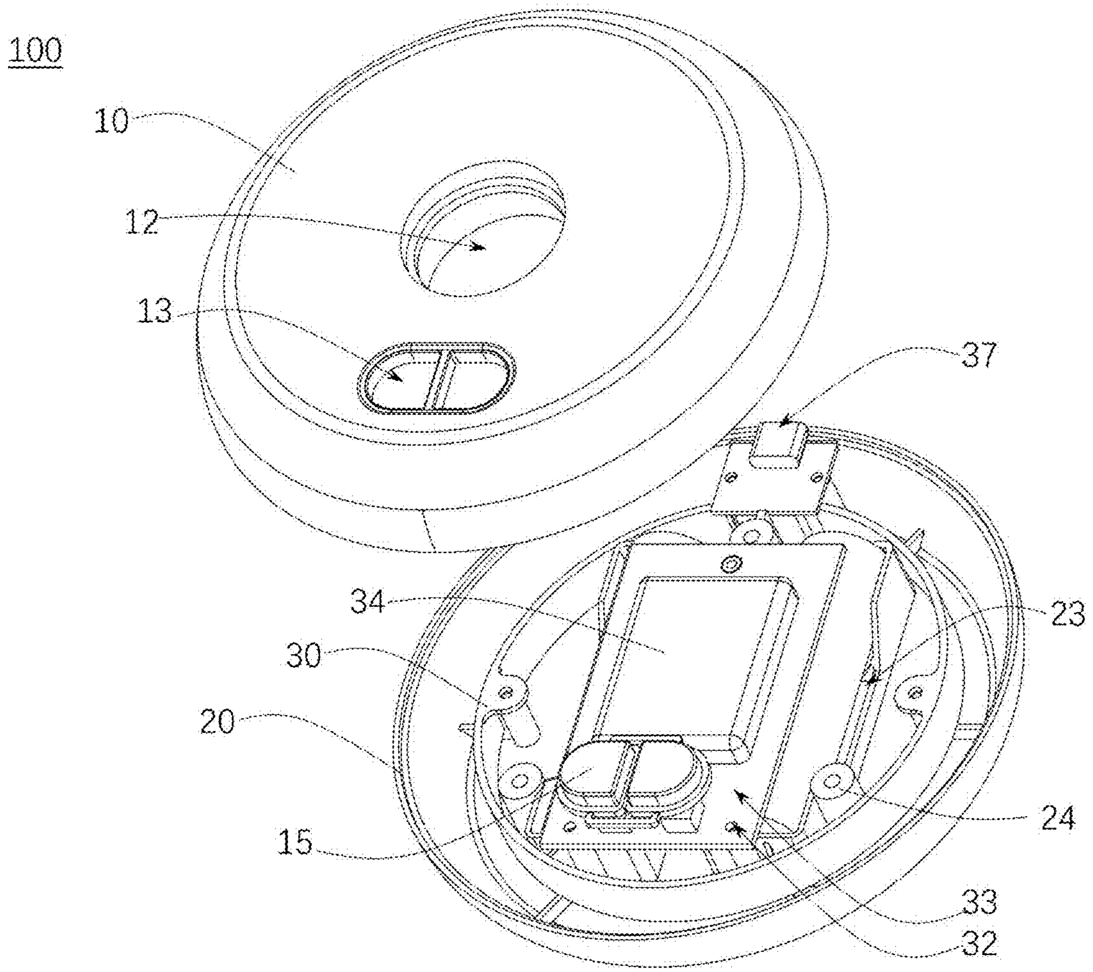
FIG. 4 is an exploded schematic structural diagram of a light-emitting base according to an embodiment of the present application.
Figure 5:
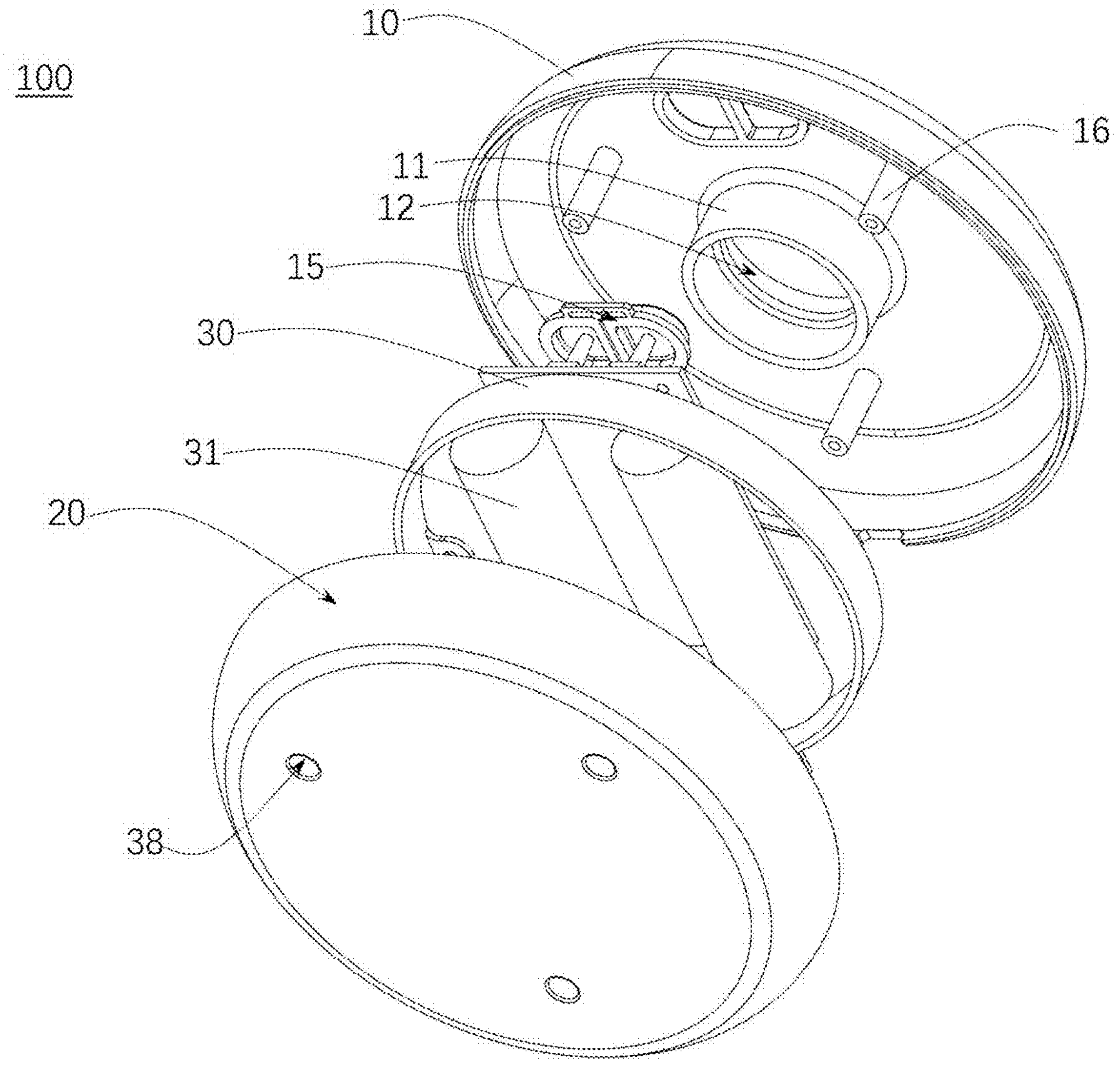
FIG. 5 is an exploded schematic structural diagram of a light-emitting base according to another embodiment of the present application.

The circuit board 33 is used to control the light emission of the light source 34. As shown in FIG. 1 and FIG. 2, the circuit board is an integrated printed circuit board (PCB). The circuit board 33 integrates a plurality of key chips and circuits, including: a main control microprocessor (MCU), which is responsible for receiving button commands and controlling lighting modes (such as constant-on, breathing, flashing, etc.); an LED driving circuit configured to provide stable and adjustable driving current for the light source 34; a battery charging management IC configured to perform safe charging management for the rechargeable batteries 31 (including overcharge, over-discharge, and overcurrent protection); and a charging port 37 connected to the outside. As can be seen from the exploded structure in FIG. 4, the charging port 37 of the micro circuit board extends outward through a charging port hole 14 on a side surface of the housing, allowing users to charge the base conveniently via a charging cable and a charger. Users operate the buttons 15 on the upper cover 10 to trigger the circuit switches on the circuit board 33, and the MCU can execute corresponding operations after receiving signals.

D. Hollow Supporting Structure Realizing Both Light Guiding and Supporting Functions The hollow supporting structure 11 at the center of the upper cover 10 is a tubular body protruding inward, and an internal cavity thereof forms a precise slot 12. The size of the slot 12 is designed to firmly install and support a tree body of a small decorative tree. When the tree body 200 is inserted into the slot 12, the structure provides stable and reliable mechanical support, ensuring that the tree body 200 stands upright and steady. The structure also serves as a connecting structure. For example, an inner wall of the slot 12 is provided with a threaded structure, enabling the light-emitting base 100 to be detachably connected to the decorative article via the threaded structure. It is understandable that in some embodiments, the inner wall of the slot 12 may or may not have a threaded structure. The structure also serves as a meticulously designed optical component, which can be referred to as a "light well" or "light guide tube". The light source 34 (LED) is precisely arranged on the bracket 30, positioned exactly at the center directly below the tubular structure, with a light emission direction vertically upward. When the LED is turned on, the light is vertically emitted upward into the "light guide tube". The light propagates within the light guide tube along two paths:

Main optical path: The light directly penetrates upward along a central axis of the "light guide tube". When a small tree trunk made of a light-transmitting or semi-transparent material (such as acrylic, optical fiber, frosted plastic, etc.) is inserted into the slot, the light is introduced from a root of the tree trunk and propagates upward along the tree trunk, thereby achieving an "internal illumination" effect of the tree trunk "from the inside out". The lighting method enables the tree body to become part of the light source, creating an effect of crystal clarity and full translucency that is far beyond the reach of traditional external illumination.

Secondary optical path: The base is also made of a light-transmitting or semi-transparent material (such as acrylic, optical fiber, frosted plastic, etc.) and thus forms a light-transmitting area. When the light propagates within the base, part of the light not only penetrates directly upward but also scatters out through side walls, forming a three-dimensional soft light source in a central area of the base. The secondary optical path not only enriches the light and shadow layering of the base itself but also adds a centrally focused visual appeal to the entire decorative article.

When the user presses the power button, the circuit board 33 is controlled to drive the light source 34 to light up. Light enters from the bottom of the hollow supporting structure 11. Part of the light travels along the main optical path through the slot, and enters and illuminates the trunk of the decorative tree inserted therein, creating an internal illumination effect; the other part of the light penetrates through the side wall of the light-emitting base 100, forming soft ambient light. If the user switches the lighting mode, the MCU controls the LED driving circuit to change the brightness or flicker frequency of the light source 34, presenting different dynamic effects. When the batteries are depleted, the user can charge the batteries through the charging port 37.

Thus, through the organic integration of "rechargeable battery power supply", "compact integrated structure", and "integration of central supporting and upward light-emitting functions", a unique lighting solution suitable for portable desktop small trees is created. The combination of the three is not a simple technical superposition but generates a synergistic effect, jointly giving birth to a brand-new product form that precisely meets the demands of the desktop decoration market. This solution solves numerous drawbacks of the large-sized, alternating-current-powered, and complex-structured decorative tree bases in the prior art, thereby significantly enhancing the usage flexibility and portability of the decorative tree; the simple design reduces manufacturing costs and improves the aesthetic value; and the central upward light-emitting method achieves a unique lighting effect.

E. Positioning Structure

To ensure precise alignment during the fastening process of the upper cover 10 and the lower cover 20, as well as structural stability after assembly, a positioning structure is provided therebetween. As shown in FIG. 2, several (for example, 3 as illustrated in the figure, evenly distributed) cylindrical positioning posts 16 extend vertically downward from a top surface of the upper cover 10. The positioning posts are not only used for precise alignment of the upper cover 10 and the lower cover 20 during fastening but also serve the function of connecting to the upper cover 10.

Correspondingly, several positioning sleeves 24 (whose positions are in one-to-one correspondence with the positioning posts 16) extend upward and are integrally formed from a bottom wall of the lower cover 20. The inner diameter of each positioning sleeve 24 is precisely matched with the outer diameter of the positioning post 16, forming a clearance fit. When the upper cover and the lower cover are assembled, the positioning posts 16 are sleeved into the positioning sleeves 24 of the lower cover. Such a post-sleeve fitting structure strictly restricts the relative position of the upper cover and the lower cover in multiple dimensions, which can effectively prevent translation of the two in a horizontal plane and rotation of the two around the central axis, ensuring that the upper cover and the lower cover can be accurately aligned in one step during fastening.

After positioning is completed, screws can be passed through reserved countersunk holes 38 from the outside of the lower cover 20 and screwed upward into threaded holes at tops of positioning posts 16, thereby firmly fastening the upper cover and the lower cover together. The positioning posts 16 also limit the position of the bracket 30. Thus, through screw fastening, the locking of the upper cover 10, the lower cover 20 and the bracket 30 can be completed simultaneously, greatly simplifying the assembly process.

The matching design of the positioning posts 16 and the positioning sleeves 24 not only ensures the accuracy and convenience of assembly, but more importantly, forms a multi-point supporting frame structure inside the base, significantly enhancing the structural rigidity and deformation resistance of the entire product when subjected to external extrusion or impact.

F. Hollow Supporting Structure Realizing Both Active Light Emission and Supporting Functions In some embodiments, the hollow supporting structure 11 serves as a light source and simultaneously undertakes the mechanical supporting function for the decorative tree body. A slot or a cavity is designed in the middle of the structure for stably inserting and supporting the trunk of the small decorative tree, ensuring that the tree body remains upright and stable when placed. Thus, the mechanical supporting function and the active light emission function are seamlessly integrated into one. Specifically, a flexible printed circuit board (FPC) customized according to the three-dimensional shape of the supporting structure is first prefabricated, and a plurality of miniature high-brightness LED chips are soldered thereon in an array arrangement. Subsequently, the FPC carrying the light-emitting array is precisely placed into a designated molding cavity of an injection mold, into which highly transparent engineering plastic or engineering plastic with a soft light diffusion effect (such as optical-grade PC or PMMA) is injected, so that the molten plastic completely encases and solidifies the entire circuit, thereby integrating a light-emitting core and the supporting structure at a molecular level. A power interface of the FPC extends to the bottom of the structure through reserved pins and is electrically connected to the circuit board 33 inside the base, and a main control chip MCU is responsible for driving and controlling the light-emitting mode of the light-emitting array. In this way, in terms of functionality, the precisely formed slot at the top of the hollow supporting structure still stably supports the trunk of the artificial tree. Aesthetically, when illuminated, the light is no longer projected from the bottom but is uniformly and softly radiated outward from the inside of the entire supporting structure, thereby forming a crystal-clear overall appearance without any visible light-emitting points and creating a dreamlike visual effect. The light can not only be efficiently guided and introduced from the root to illuminate the entire tree body, but also diffuse to the surrounding environment to render gentle ambient light, ultimately achieving a high degree of unity between structure and function, and between engineering and aesthetics.

G. Light-Emitting Structure on the Side Wall of the Base

In some embodiments, to endow the base with vivid light and shadow expressiveness, a series of tiny light-emitting holes or slender grid-like slits with specific patterns are formed on the sidewall of the upper cover 10 or the lower cover 20 during the injection molding stage by means of precisely designed molds. The dimensions and arrangement of the holes are determined by optical calculations, thereby forming starbursts, rings, or rhythmic stripes. Meanwhile, the material of the housing is selected from engineering plastics with good light-shielding properties to ensure that light does not diffuse and spill out from non-preset areas, thereby guaranteeing the clarity and sharpness of light-emitting patterns. When the light source 34 located at the center inside the base is turned on, the emitted light fills the entire internal cavity of the base. A portion of the light is guided and precisely emitted through the preset holes in the sidewalls, thereby forming a refined and layered light-and-shadow effect on a vertical surface of the base. This not only breaks the dullness of the base as a mere carrier, transforming the base into a dynamic light-and-shadow painting. Moreover, the light emission of the base complements and echoes the upward light emission of the main body, thereby creating a unique immersive atmosphere of all-around light emission from inside to outside for the entire product.

H. Replaceable Hollow Upper Cover

In some embodiments, to endow the product with personalized customization and adaptability to different scenarios, the upper cover 10 is structurally designed as an independent quick-release module. The connection of the upper cover to the lower cover 20 is not achieved through traditional screws or fixed buckles, but via magnetic fasteners or snap-fit joints. Specifically, a plurality of miniature strong neodymium magnets are embedded respectively in an inner edge of the upper cover and an edge of a mating opening of the lower cover. When the upper cover is brought close by the user, magnetic force guides the upper cover to automatically and precisely align and provides an initial adsorption fixation; meanwhile, shallow elastic snap-fit joints disposed at the edge provide a crisp "click" feedback when the upper cover is fully seated, and ensure the stability of final engagement. This design allows the user to easily perform detachment and installation without any tools, relying solely on intuition, which greatly lowers the threshold for replacement operations. Each replaceable upper cover is a carefully designed work of art. The top surface of the upper cover features hollowed-out patterns with different themes, created via laser engraving or high-precision injection molding processes, such as snowflakes and reindeer for Christmas, the arrow of love for Valentine's Day, or tranquil stars and moon motifs for daily use. When the light source inside the base is turned on, light passes vertically through the artistic holes. Beyond simple illumination, a complete and clear light-and-shadow artwork is projected upward, incorporating the ceiling or surrounding environment into the decoration. This transforms the entire product from a light-emitting base into an ambient projection lamp that can tell stories and create specific scenarios, thereby significantly enriching the use value and emotional connection of the product.

It is apparent to those skilled in the art that the present application is not limited to the details of the above exemplary embodiments, and can be embodied in other specific forms without departing from the spirit or essential characteristics of the present application. Therefore, from any point, the embodiments should be considered exemplary and not restrictive, and the scope of the present application is defined by the appended claims rather than the above description, and thus, all changes that come within the meaning and range of equivalence of the claims are intended to be embraced therein. Any reference sign in the claims should not be regarded as limiting the claims involved. The above content is only a specific implementation of the present application, but the scope of protection of the present application is not limited thereto. Any changes or replacements within the technical scope disclosed by the present application should fall within the scope of protection of the present application. Therefore, the scope of protection of the present application should be subject to the scope of protection of the claims.

The invention claimed is:

1. A light-emitting base for illuminating a decorative article, comprising:

a housing formed by connecting an upper cover and a lower cover;

a light source configured to illuminate the decorative article and disposed inside the housing;

a rechargeable power source disposed inside the housing and supplying power to the light source; and a hollow supporting structure integrally formed at a center of the upper cover and extending toward the lower cover, wherein a slot is formed in the supporting structure and configured to connect and support the decorative article, light emitted from the light source passes through an inner cavity of the slot to illuminate the decorative article when the decorative article is connected to the slot, and an inner wall of the slot is provided with a threaded structure configured to detachably connect the decorative article to the light-emitting base, wherein at least one light-transmitting area is provided on a side wall of the upper cover and/or the lower cover, and the light emitted from the light source is capable of at least partially passing through the light-transmitting area to be emitted outward to form ambient atmosphere light.

2. The light-emitting base according to claim 1, wherein the supporting structure is cylindrical or frustum-shaped.

3. The light-emitting base according to claim 1, wherein the light source is disposed directly facing the inner cavity of the slot, and the light emitted therefrom passes through the inner cavity to illuminate the decorative article from an inner side of the decorative article.

4. The light-emitting base according to claim 1, wherein the light source is disposed on a bottom side of the supporting structure.

5. The light-emitting base according to claim 1, wherein the light source comprises a plurality of sub-light sources, and the plurality of sub-light sources are discretely distributed on a bottom side of the supporting structure.

6. The light-emitting base according to claim 1, wherein at least one button is provided on a surface of the upper cover for controlling an on-off state and a lighting mode of the light source.

7. The light-emitting base according to claim 1, wherein at least one light-transmitting area is provided on a top wall of the upper cover, and the light emitted from the light source is capable of at least partially passing through the light-transmitting area to be emitted outward to illuminate the decorative article from an outer side of the decorative article.

8. The light-emitting base according to claim 1, wherein the upper cover is connected with the lower cover via a detachable connecting structure.

* * * * *